United States Patent [19]

Redd et al.

[11] Patent Number: 5,552,461

[45] Date of Patent: Sep. 3, 1996

[54] COMPOSITION AND METHOD FOR IMPROVING THE EXTRUSION CHARACTERISTICS OF AQUEOUS STARCH-POLYMER MIXTURES

[75] Inventors: Randall V. Redd, Wilmington; Paul W. Bacon, Hockessin, both of Del.

[73] Assignee: Environmental Packing L.P., Wilmington, Del.

[21] Appl. No.: 366,652

[22] Filed: Dec. 30, 1994

[51] Int. Cl.$^6$ .............................. C08L 3/00; C08L 89/00; C09D 4/00

[52] U.S. Cl. .................. 524/47; 524/312; 524/313; 524/322; 206/214; 106/162.2; 106/207.4; 106/207.5; 106/214.2; 106/215.4

[58] Field of Search .................. 524/47, 312, 313, 524/322; 206/814; 106/122, 210, 211, 213

[56] References Cited

U.S. PATENT DOCUMENTS

| | | | |
|---|---|---|---|
| 4,863,655 | 9/1989 | Lacourse et al. | 264/53 |
| 5,095,054 | 3/1992 | Lay et al. | 524/47 |
| 5,208,267 | 5/1993 | Neumann et al. | 521/79 |
| 5,266,368 | 11/1993 | Miller | 428/35.6 |
| 5,322,866 | 6/1994 | Mayer et al. | 524/47 |

OTHER PUBLICATIONS

Werner & Pfleiderer, Processing: Plastics Recycling, *Plastics and Chemical Technology*, 05 140/1–2.0–X.92 Kodo, Brochure.

*Primary Examiner*—Paul R. Michl
*Assistant Examiner*—LaVonda R. DeWitt

[57] ABSTRACT

A method for improving the extrusion characteristics of finely divided aqueous starch-polymer mixtures comprising subjecting the admixture to deaeration and compaction to form a hard shaped form therefrom, milling the hard shaped form of starch and polymer admixture to form granules. Granules of selected size are then coated with a lubricating compound.

9 Claims, No Drawings

COMPOSITION AND METHOD FOR IMPROVING THE EXTRUSION CHARACTERISTICS OF AQUEOUS STARCH-POLYMER MIXTURES

FIELD OF INVENTION

The invention is directed to a starch and polymer composition having improved extrusion properties, especially when it used to form loose-fill packing, and to a method for making such compositions.

BACKGROUND OF THE INVENTION

Expanded packing products, which are resilient polymeric foams, enjoy widespread use as packing materials. Of these, polystyrene has been predominant, not only because of its strength and stability, but in large part because of its very low cost. However, polystyrene foams have the serious disadvantage that they are not degradable under the environmental conditions that prevail in compost heaps, landfills and other common disposal routes for such materials.

As a result of increasing concerns with the ecological impact of disposing of such packing materials, particularly the utilization of landfills, considerable attention has been paid in recent years to the use of starch-polymer mixtures as a substitute for synthetic polymers in polymeric foam packing materials. Starches and many of their derivatives, of course, have the advantage that they are biodegradable. Polymers are used in a minor amount with the starch to increase stability, stiffness, elasticity, etc., of the packing foam. However, the amount of synthetic polymer, even if it is not itself degradable, is sufficiently low so that it is does not interfere substantially with the degradability of the starch.

In the manufacture of foams for packing applications using starch as the polymer base, the starch is admixed with a minor amount of synthetic polymer and water to form an aqueous starch-polymer powder mixture, which is then extruded to form various shapes such as spheres, pellets or "peanuts."

The manufacture of extruded foam shapes in the above-described manner has proved to be troublesome because it has been found to be difficult to achieve uniform moisture content, which is vital to the method, and also to achieve consistent feed properties. In addition, the extruder feed made in this manner tends to plug the extruder, which necessitates shutting down and cleaning the unit before production can be resumed.

The equipment for this mode of operation is expensive and requires a higher level of operating skill to achieve reliability. Furthermore, the process is energy intensive and requires an extra operational step (drying).

In a variation of this process, starch and polymer are heated and mixed prior to the addition of water. The still dry admixture is then mixed with water and degassed under vacuum, after which it is fed continuously into a single or twin screw extruder to form pellets. The material is shipped in pellet form. The loose fill manufacturer then feeds the pellets to a second extruder in which the pellets are remelted and extruded into the various product shapes. (See Werner and Pfleiderer, GmbH brochure No. 05 140/1-2.0-X.92 KODO, entitled "Processing: Plastics Recycling.")

It has been found that this second method overcomes most of the disadvantages of the first-described method. However, it is more expensive both because of the increased number of steps in the method and in the higher cost of the equipment. Therefore, there is considerable need for a method of producing such foamed starch-polymer mixtures which is both easier and less expensive to operate.

PRIOR ART

U.S. Pat. No. 4,863,655, Lacourse et al., discloses a biodegradable packing material comprising an expanded high amylose starch prepared by extruding the starch in the presence of moisture. The inclusion of various synthetic polymers to improve strength, flexibility, resiliency and water resistance is disclosed.

U.S. Pat. No. 5,095,054 to Lay et al. is directed to the manufacture of shaped articles by extruding a material comprising a destructurized starch and any of several classes of organic polymers and copolymers such as modified polysaccharides, poly(vinyl pyrrolidone), cationic and anionic starches, poly(vinyl acetate) polymers and copolymers and the like.

U.S. Pat. No. 5,208,267 to Neumann et al. is directed to a method for making a starch product suitable as a packing filler comprising extruding a mixture of starch and poly-(alkylene glycol) and optionally poly(vinyl alcohol) and a bubble nucleating agent.

SUMMARY OF THE INVENTION

In a first aspect, the invention is directed to a method for improving the extrusion characteristics of mixtures of starch and polymers comprising the sequential steps:

(1) admixing finely divided particles of starch and polymer with a minor amount of water, the amount of water being such that the admixture is maintained in powder configuration;

(2) forming a hard shaped form of the starch and polymer admixture by subjecting the admixture to de-aeration and compaction;

(3) milling the hard shaped form of starch and polymer admixture and classifying the particles therefrom to separate a quantity of the milled admixture in granular form having a particle size of 250–3500 micrometers and an average particle size of 600–1700 micrometers from the oversized particles and fines; and (4) admixing a lubricating compound with the separated particles having a particle size of 250–3500 micrometers to effect coating of the particles while maintaining the particles in granular configuration.

Preferably, the fines from step (3) are recycled to the feed inlet of the compactor and the oversized particles are recycled to the granulator.

In a second aspect, the invention is directed to an extrudable composition comprising granules of a de-aerated and compacted admixture of finely divided starch and polymer particles with water.

BRIEF DESCRIPTION OF THE DRAWINGS

The drawing consists of a single figure which is a block flow diagram showing the steps of the method of the invention.

DETAILED DESCRIPTION OF THE DRAWING

A. Starch:

Virtually any kind of natural starch is suitable for the practice of the invention. For example corn, wheat, potato, rice, milo, tapioca, arrowroot and sago starches are all suitable. In general, corn, wheat and potato starch are preferred, of which potato and wheat starch are still further preferred. Modified starches, such as cationic starch, are also suitable.

As used herein, the term "modified" refers to starches which have been derivatized or modified by processes such as esterification, oxidation, acid hydrolysis, cross-linking and enzyme conversion. Typically, modified starches include esters, such as the acetate and half-esters of dicarboxylic, starches oxidized with hypochlorite, starches reacted with crosslinking agents, etc.

Unlike many prior art processes, it is not necessary that the starch, whether natural or modified, be gelatinized. In fact, it is preferred that the starch not be gelatinized for the reason that it adds substantially to the energy load of the process without yielding any advantage in properties over the product derived from the non-gelatinized starch feed.

It will be recognized by those skilled in the handling of starch and starch derivatives that they in most instances contain a small amount of water, which may be as high as 25% by weight of the moist starch. In the formulation of the starches used in the invention, the amount of starch is calculated on a dry basis and the water is calculated separately, whether it is included in the starch or whether it is separately added. (See Section D below.)

B. Polymer:

In the manufacture of foamed starch-polymer mixtures, a wide variety of both natural and synthetic thermoplastic polymers can be used, such as those disclosed in the above-referred Lay et al. patent. As taught by Lay et al., minor amounts of either water-soluble or water-insoluble polymers as well as mixtures can be used. The selection of particular polymers is dependent upon the physical properties sought for the extruded product and the interactions of the starch with the polymer. Polymers preferred for use in the compositions of the invention include poly(vinyl acetate), ethylene-vinyl alcohol copolymer, poly(caprolactone) and polylactides. An especially useful material is a mixture of poly(vinyl acetate) and poly(vinyl alcohol). As mentioned hereinabove, polymers are added to adjust the resilience, stiffness and elasticity of the extruded foam product.

C. Lubricating Agent:

Preferred lubricating agents are hydrogenated vegetable oils or fatty acids and salts thereof, mono- and di-glycerides, stearates of aluminum, calcium, magnesium and tin as well as talc, silicones, glycerides, phospholipides and the like. The amount of lubricant coated on the classified granules must be at least 0.1% by weight in order to obtain any significant technical effect. But more than 5% is detrimental because the coated particles become too slippery and do not undergo sufficient compression in the extruder. From 0.5 to 1.0% lubricant is preferred.

D. Other Components:

The compositions of the invention will ordinarily contain secondary additives such as flame retardants, stabilizers, anti-oxidants, foaming agents, nucleating agents, humectants, hydrophilic polymers, fillers, coloring agents, rheology control agents and the like. As indicated hereinabove, the granular compositions of the invention also contain a coating of lubricant. However, it is essential that this coating be applied on the particles after granulation and not premixed with the starch. Thus, the recycled fines and coarse particles separated after granulation are not coated with lubricant. The compositions of the invention will ordinarily contain no more than 5% by weight, basis total admixture, of any of such secondary additives and preferably no more than a total of 10% of such additives lest the additives adversely affect the physical properties of the foamed starch-polymer mixture.

D. Formulation:

In the following discussion of the formulation of the product of the invention, component proportions are all given on the basis of the total weight of the admixture.

The basic compositions of the invention are comprised of 40–90% starch, 0–30% polymer and 1–30% water.

Polymers, whether water soluble or insoluble, are not always needed in the compositions of the invention. In some instances the physical properties of the starch are by themselves adequate and do not require augmentation with other polymers. However, when it is desired to augment the properties of the starch, at least 1% polymer is needed in order to obtain any significant technical effect of the polymer, which is to adjust the physical properties of the foamed admixture. In particular, the polymer is usually needed to obtain adequate rigidity, resilience and density control of the extruded product. However, more than 30% by weight polymer is to be avoided so that the above-referred physical properties of the extruded foamed product are not changed excessively. From 10–30% polymer is preferred, 15–20% being particularly preferred.

At least 10% water is needed in the composition to assure adequate foam formation during extrusion. More often, at least 15% is needed and at least 16% is preferred. In no event should the total amount of water, including any moisture that may be contained in the starch, exceed 30% lest the composition become sticky and doughlike. It is preferred that the amount of water not exceed 20% and preferably still no more than 18%. In all cases, the water content of the formulation must be sufficiently low that the admixture is retained in the form of flowable discrete particles.

Starch is, of course, the major component of the invention composition and comprises 40–90% thereof, basis dry starch. It will, however, ordinarily be preferred that the composition contain at least 60% starch.

E. Processing:

De-aeration and compacting of the aqueous starch-polymer powder mixture is carried out in a pressure compaction device such as a molding or tabletting press or, preferably, a roll press (roll-compactor). The compacted admixture is converted into the form of a solid sheet, eggs, pillows, spheres or tear drops, depending on the configuration of the press or rolls.

The preferred apparatus used in carrying out the method of the invention is a roll compactor in which the formulated aqueous powder is forced between two counter rotating rolls. As the volume of the powder decreases through the region of maximum pressure between the rolls, the mixture is formed into a solid compact shape. Various roll surfaces are available by which the texture and configuration of the product can be altered in order to adapt to the physical properties of the feed mixture. Two basic types of roll configurations are available: (1) smooth or circumferential corrugations and pocket indentations or (2) corrugations in the axial direction across the width of the roll. For the purposes of the invention, it is preferred that the compacted product be in the form of a sheet because it is most easily granulated in that form. Nevertheless, pellets and other shapes can also be used.

The granulation operation of the above-described hard product form is carried out by the use of conventional grinding equipment. Impact breakers such as hammer crushers, rotor impactors, pulverizers, disintegrators and the like are each suitable for this step in the method of the invention. Particularly preferred equipment for use in the invention are Chilsonator® compaction/granulation systems manufactured by the Fitzpatrick Company, Elmhurst, Ill. These systems combine the compaction, granulation and classification functions into an integrated System. It is essential that the sheet material produced in the roll compactor be reduced in size to a particle distribution suitable for extrusion. It is preferred that the granulated particles be within the range of 250–3500 micrometers and have an average particle size of 600–1700 micrometers.

Turning now to the Drawing, a preferred mode of the invention is illustrated in which water and finely divided particles of starch and polymer are introduced via lines 1, 3 and 5, respectively, into mixer 100 in which they are formed into a uniform admixture which is still in the form of finely divided particles. The admixture of finely divided particles is introduced through line 7 into the feed inlet of roll compactor 300 in which the admixture is deaerated and compacted into sheet form. The compacted sheet is then passed from the roll compactor through line 9 into granulator 500 in which the compacted sheet is reduced in particle size to form granules. The size-reduced sheet contains oversized particles and fines, as well as particles falling within the range of 250–3500 micrometers. This mixture of particles is then passed from the granulator via line 11 to screener 700 in which the oversized particles and fines are separated from the properly sized product particles. The oversized particles are recycled from the screener via line 13 to the feed inlet of granulator 500 and the fines are recycled via line 17 to the feed inlet of the roll compactor 300 in which they are admixed with the aqueous starch/polymer feed mixture and subjected to de-aeration and compaction. Screened particles falling within the range of 250–3500 micrometers are removed from screener 700 through line 15 to mixer 900 in which they are mixed and coated with lubricant which has been introduced from storage through line 19. The maximum amount of lubricant is such that the admixture is maintained in granular form. The lubricant-coated product is then passed from the lubricant mixer through line 21 to storage as feed for subsequent extrusion or passed directly to an extrusion operation.

The components of the invention composition are easily formulated using low-shear mixing devices such as ribbon mixers. The order of mixing the solid components is not important. However, the water should be added last to the admixture of solids.

It is essential to the practice of the invention that the aqueous admixture of starch and polymer be compacted sufficiently. In particular, the compacted shapes emerging from the compactor should have a Stokes hardness of at least 1 kg in order that they do not fall apart and become powdery during transport and thus produce excessive amounts of fines during granulation. It is essential that the amount of fines be minimized since powders in the presence of moisture tend to produce a sticky mass which clogs the nozzle end of the extruder. In general, it can be said that the amount of fines produced during granulation is an inverse function of the hardness of the compacted particles. It is therefore preferred that the compacted shapes have a Stokes hardness of at least 3 kg.

After compaction, the hard forms, whether they are sheets, spheres, pellets or other shape, must be subjected to size reduction to produce particles having a size of 250–3500 micrometers. They must be at least 250 micrometers in size so they avoid the disadvantageous properties of dust. On the other hand, the granulated particles must not exceed 3500 micrometers lest they become difficult to feed into the extruder due to an insufficient level of de-aeration between particles. Following compaction, the granulated particles are classified to separate the fines and oversized particles therefrom. Both the fines and oversized particles can be recycled. The fines are most advantageously recycled to the mixer in the first step of the method and thus reprocessed in admixture with the aqueous starch-polymer mixture. The oversized particles are preferably recycled to the inlet of the granulator in admixture with the unmilled hard shaped forms from the compactor. It is preferred that both recycles be conducted simultaneously.

The properly sized granular particles are then passed to a very low shear mixer in which they are mixed with a very small amount of lubricant compound. For the reasons set out hereinabove, at least 0.1% by weight lubricant is required to get any significant technical effect, but more than 1% should be avoided. A low shear mixer is preferred for the lubricant mixing step in order to avoid excessive breaking up of the sized granules and the formation of fines.

The method of the invention requires substantially less energy than the prior art processes for several reasons:

(1) it is not necessary to gelatinize the starch;

(2) it is not necessary to adjust the moisture content of the starch/polymer admixture; and (3) less process energy is needed to form the product, e.g., by extrusion.

The invention will be better understood by reference to the following examples:

EXAMPLES

Example I

An admixture comprising starch and polymer was prepared by adding wheat starch to a Munson Mixer, after which poly(vinyl alcohol) and talc were added sequentially. While the components were added to the mixer, water was also added slowly to the mixer in order to obtain even wetting of the powder. The resulting admixture had very poor flow characteristics, was cake-like in consistency and had small lumps up to ⅛-inch in size. The composition of the admixture was as follows, basis weight of the aqueous admixture:

| | |
|---|---|
| Genvis wheat starch (Archer Daniels Midland, Decatur, IL) | 67.5% |
| Airvol 540 poly(vinyl alcohol) (Air Products and Chemicals, Allentown, PA) | 17.3% |
| Magnesium silicate (Whittaker, Clark and Daniels, South Plainfield, NJ) | 1.2% |
| Water | 14.0% |

The above-described admixture was passed to the inlet of a Fitzpatrick granulation/compaction system having 7-inch by 10-inch compaction rolls. The admixture was compacted in sheet form and passed to an integrated hammer mill in which a size-reduced product was produced which passed through a 6 U.S. Standard mesh screen (mesh opening 3.4 mm) and was retained on a 18 U.S. Standard mesh screen (mesh opening 1 mm). The collected product had an average bulk density of 0.49 pounds per cubic foot and contained less than 6% wt. particles smaller than 30 mesh. The collected product was mixed with various proportions of stearic acid lubricating agent (0.1–1% wt.) and fed to a single-screw Maddox 650 Extruder (Maddox Metal Works, Dallas, Tex.). The foamed product from the extruder had a density of 0.58–0.9 pounds per cubic foot. Unlike uncompacted starch-polymer admixtures, the compacted admixture ran through the extruder very smoothly without any tendency toward plugging and produced a resilient foam which was very uniform in its physical properties. The foamed product was found to have fully equivalent physical properties to such foams prepared from pelletized starch-polymer admixtures.

Example II

The procedure of Example I was repeated using a similar compactor having 4-inch by 10-inch rolls to prepare a foamed admixture having the following composition by weight:

| | |
|---|---|
| Wheat starch | 80.8% |
| Poly(vinyl alcohol) | 10.9% |
| Magnesium silicate | 1.4% |
| Stearic acid (Emery Div., Henkel Corp.) | 0.9% |
| Iron oxide pigment | 0.04% |

Water was added to the admixture to achieve a total water content of 18% wt., as measured by a Protimeter moisture analyzer. The above-described lubricant coated admixture was extruded over a wide range of pressures. All of the attempts made to compact these admixtures were unsuccessful.

We claim:

1. A method for improving the extrusion characteristics of starch-polymer mixtures comprising the sequential steps of:
   (1) admixing finely divided particles of starch and polymer with a minor amount of water, the amount of water being such that the admixture is maintained in powder configuration;
   (2) forming a hard shaped form of the starch and polymer admixture by subjecting the admixture step (1) to de-aeration and pressure compaction;
   (3) milling the hard shaped form of starch and polymer admixture and classifying the particles therefrom to separate a quantity of the milled admixture in granular form having a particle size of 250–3500 micrometers and average particle size of 600–1700 micrometers from any oversized particles and fines; and
   (4) admixing a lubricating compound with the separated particles having a particle size of 250–3500 micrometers and average particle size of 600–1700 micrometers to effect coating of the particles while maintaining the particles in granular configuration.

2. The method of claim 1 in which the fines produced by classification of the milled hard sheet in step (3) are recycled in combination with the aqueous admixture of starch, and polymer and water to step (1).

3. The method of claim 1 in which the oversized particles produced by classification of the milled hard shaped form in step (3) are admixed with the hard shaped forms from step (2) and fed to step (3).

4. The method of claim 1 in which the shaped form is a sheet produced by roll compaction.

5. The method of claim 1 in which the milled particles before admixing with lubricant contain, by weight, 40–90% starch, 1–30% polymer and 1–30% water.

6. The method of claim 1 in which the starch in step (1) is non-gelatinized.

7. An extrudable composition comprising granules of a de-aerated and compacted admixture of finely divided starch, polymer particles and water, the granules having a Stokes hardness of at least 1 kg and are coated with a lubricating compound.

8. The composition of claim 7 which contains, by weight of the admixture excluding the lubricant coating, 40–90% starch, 1–30% polymer and 1–30% water.

9. The composition of claim 7 in which the finely divided starch is non-gelatinized.

* * * * *